Sept. 23, 1969     T. HOPKA     3,467,995

SEAT BELT BUCKLE

Original Filed June 15, 1966     2 Sheets-Sheet 1

INVENTOR

THOMAS HOPKA

BY Hauke, Kess, & Gifford

ATTORNEYS

Sept. 23, 1969 T. HOPKA 3,467,995
SEAT BELT BUCKLE
Original Filed June 15, 1966 2 Sheets-Sheet 2
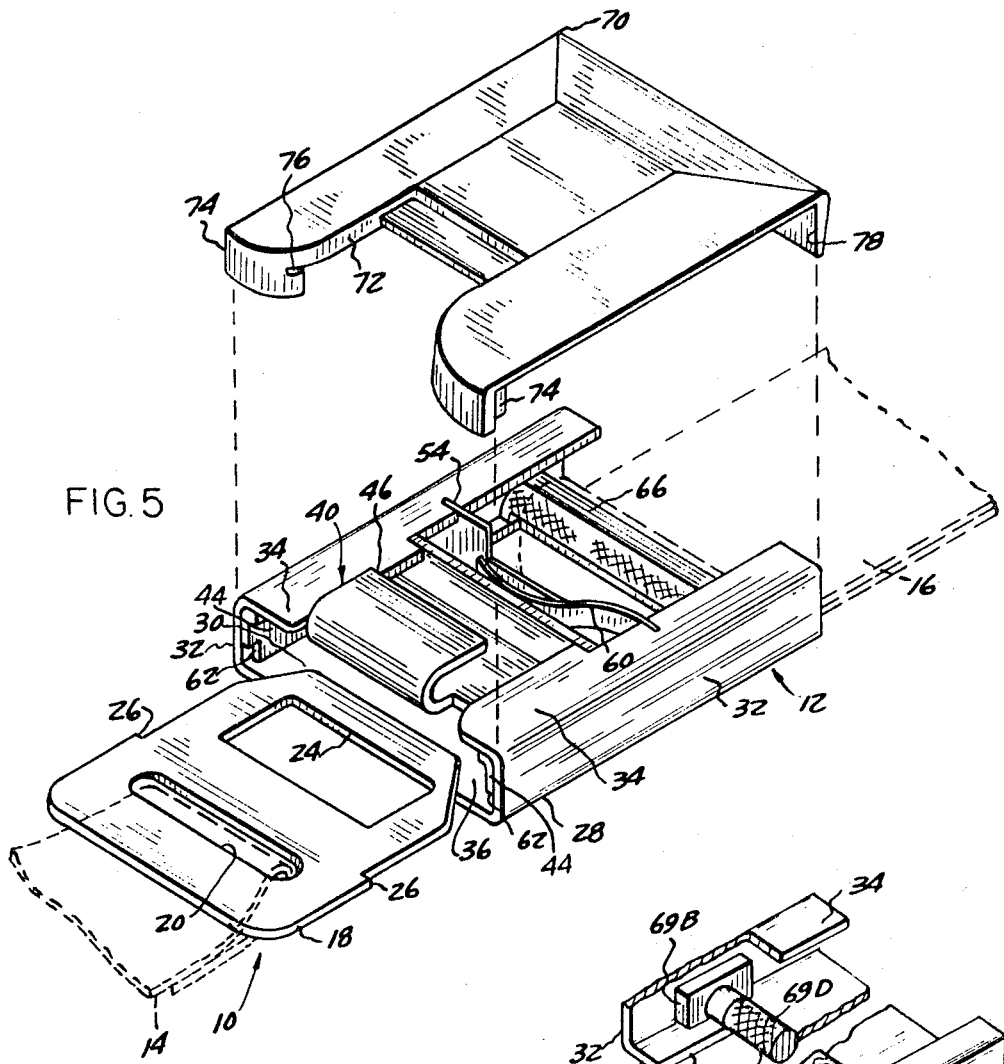
INVENTOR
THOMAS HOPKA
BY Hauke, Kruss, & Gifford
ATTORNEYS

3,467,995
SEAT BELT BUCKLE
Thomas Hopka, Belleville, Mich., assignor to Jim Robbins Seat Belt Co., Troy, Mich., a corporation of Michigan
Continuation of application Ser. No. 557,717, June 15, 1966. This application Dec. 20, 1967, Ser. No. 697,549
Int. Cl. A44b 11/28
U.S. Cl. 24—77                                                                      11 Claims

ABSTRACT OF THE DISCLOSURE

A channel-shaped buckle housing with a flat base is open at one end to receive an apertured tongue. An upturned lug in the flat base engages the apertured tongue when they are in face to face relationship. A slidable locking member in the housing is movable along an axis toward and away from the open end of the housing between a locking position preventing separation of the tongue away from the base and the lug, and a released position permitting the tongue to be separated from the base.

CROSS REFERENCE TO RELATED APPLICATION

The present application is a continuation application of Ser. No. 557,717, filed June 15, 1966, now abandoned.

BACKGROUND OF THE INVENTION

Field of the invention

This invention relates to safety seat belt buckles and more particularly to a slide action buckle assembly comprising a first buckle section and a second buckle section separable from one another upon application of a force parallel to the movement of separation of the two buckle sections.

Description of the prior art

Safety seat belt buckles are used in combination with seat belts anchored to a vehicle such as an automobile or an aircraft and are employed as a means for restraining a body from displacement from the seat upon a sudden deceleration of the vehicle. Buckles for this purpose must meet many rigid requirements. Of primary importance, they must provide a high holding force. They should be relatively easily engageable and releasable. They must be so constructed that they will not or cannot be inadvertently or accidentally released. There are many buckles in the prior art which generally meet the aforementioned requirements and generally they take the form of a housing section, one end of which has a belt secured thereto and the other end of which is provided with an insertion aperture, and a tongue section which has a belt end secured thereto and which is adapted to be inserted in the housing section and locked therein by a cooperating member carried in the housing. Normally the locking member or apparatus disposed in the housing includes a latch member or a spring tensioned cam member which may be released from the tongue member by a finger gripping member which is movable away from the body of the housing.

It has been found from experience, particularly from studies of automobile accidents, that the various vehicle members may be distorted to the extent that very little room is available for moving the finger grip member away from the body of the housing to permit the buckle section to be disengaged. In order to obviate this problem, another form of seat belt buckle has been provided with a button member which is operable to disengage the tongue member upon the imposition of a force on the button and towards the housing. The advantage of this type of construction is that the actuating movement requires a very minimum space requirement. The major disadvantage of this type of construction is that there is a possibility of accidental releasing of the buckle sections caused by inertia of the buckle components resulting from a sudden forward movement of the body constrained by the seat belt and caused by a sudden deceleration of the vehicle.

A 1964 patent to Carter, U.S. No. 3,130,466, suggested a structure to obviate the above problems taking the form a buckle construction employing a pair of buckle sections separable upon the application of a force parallel to the direction of the movement of separation of the two sections. One of the buckle sections takes the form of a frame including a base portion and a pair of flanges spaced from the base. A lug is provided in the base and a spring tensioned locking assembly slidably mounted on the flanges for movement between a first position over the lug and a second position spaced from the lug. The second buckle section takes the form of an apertured tongue which is received by the frame and engaged with the lug by overlaying the base. The locking assembly is then moved to its first position to prevent separation of the tongue from the base.

The structure suggested by Carter has a disadvantage in that the locking assembly does not completely eliminate relative movement between the tongue and the base portion. Even where a pair of lugs are employed, the tongue member achieves a pivoting or working action with respect to the base under high inertial forces imposed by the constrained body, thereby reducing the holding capability of the buckle assembly.

SUMMARY OF THE INVENTION

In the present invention, on the other hand, a locking member is slidably disposed in a housing having a lugged base and an apertured tongue is engaged with the lug. The locking member is moved over the tongue and lug to prevent separation of the tongue from the base portion by providing a plurality of bearing points on the tongue. Preferably, the locking member provides at least three non-linear bearing points, one at the leading edge and one at each of the sides of the tongue near its mid-section.

This improved structure provides a buckle assembly having a greater holding force which is the primary requirement of safety seat belt buckles. This greater holding force is achieved by completely eliminating separation between the tongue and the base of the housing section by providing a unitary locking member providing a plurality of bearing points on the tongue. Furthermore by providing a buckle housing in which a unitary locking member is guided for movement in two spaced planes represented by the flanges and the base of the housing, a more rigid and non-yielding buckle is available.

It will therefore be seen that a seat belt buckle assembly embodying the present invention eliminates accidental disengagement of the buckle sections by providing a finger gripping releasing member which is movable in a direction paralleling the separation movement of the two buckle sections. Furthermore the improved buckle assembly provides an unfailing release in the event of an accident. There are fewer essential components in the preferred buckle assembly than has heretofore been required in any buckle assembly known in the prior art, thereby minimizing the costs of fabrication and assembly and ensuring a streamlined appearance. Because of the few essential members required in the preferred assembly, it is inherently reliable. In addition, the housing member has a minimum number of apertures provided therein, thus reducing the stress concentration areas developed upon application of the belt forces.

A still further disadvantage of the structure illustrated by the aforementioned Carter patent is the potential hazard presented by an exposed locking member which is displaced between a first operative position where it overlays the buckle housing and a second operative position where it extends beyond the extreme end of the housing. In the first position, a full firm grip cannot be imposed to apply a releasing effort. In the second position, the overhanging section of the locking member presents a potential hazard in catching the wearing apparel of the user. Furthermore, in the event of an accident, distorted vehicle sections may not provide sufficient clearance for this type of locking member to be readily extended for disengagement of the buckle sections.

Another special feature of the preferred embodiment is a novel belt terminal. The improved belt terminal takes the form of a belt receiving opening provided in the base of the housing, a belt engaging bar member which extends across the opening and has end sections guided for movement by the flanges and bearing sections forming opposite sides of the opening. The end sections have a dimension transverse to the bar greater than the distance between the flanges and the bearing sections to prevent rotational movement of the bar. This improved structure eliminates the requirement for slots in the side wall sections of conventional buckle housings and which accommodate the opposite ends of the terminal bar. The elimination of these slots improves the stress bearing characteristics of the improved buckle housing.

It is an object of the present invention to improve slide-action type safety seat belts characterized by an apertured tongue employed to overlay a lugged base section of a buckle housing by providing for a slidable locking member which in its locking position provides a plurality of bearing points on the tongue to eliminate separation of the tongue from the base.

It is a second object of the present invention to improve the safety features of seat belt buckle assemblies by providing a two part buckle assembly comprising a first buckle section including a tongue member; and a second buckle section including a housing having an insertion opening for the first buckle section, a lug formed in the base of the housing for engaging the apertured tongue and a locking member slidably disposed in the housing for movement toward and away from an overlapping position with respect to the tongue, and releasable only upon the application of a force parallel to the base portion of the housing, thereby eliminating the possibility of an accidental releasing of the two buckle sections caused by an inadvertent force applied by a member moving toward or away from the buckle housing.

It is another object of the present invention to reduce the cost of seat belt buckle construction by providing a seat belt buckle assembly comprising a minimum number of operative parts including a housing member having a lug portion, a tongue member provided with an aperture for engaging the housing lug, a locking member disposed within the housing and slidably movable into and out of a position engaging the tongue in a locked position and a spring member anchored to the housing for normally urging the locking member into a locking position.

Still another object of the present invention is to improve the stress bearing capability of seat belt buckle housings by providing a belt engaging bar slidably disposed within the housing and including spaced apart flanges associated with the extreme ends of the bar to prevent rotational movement thereof.

Still further objects and advantages will readily occur to one skilled in the art to which the invention pertains upon reference to the following detailed description and the accompanying drawings in which FIGURE 1 is a plan view of a seat belt buckle assembly illustrating the preferred embodiment of the present invention;

FIGURE 5 is a perspective view of the preferred seat belt buckle assembly with the two buckle sections in the separated relationship;

FIGURE 6 is a sectional view taken along the lines 6—6 of FIGURE 3; and

FIGURE 7 is a perspective view illustrating an alternative form of belt terminal bar.

Figure 1:
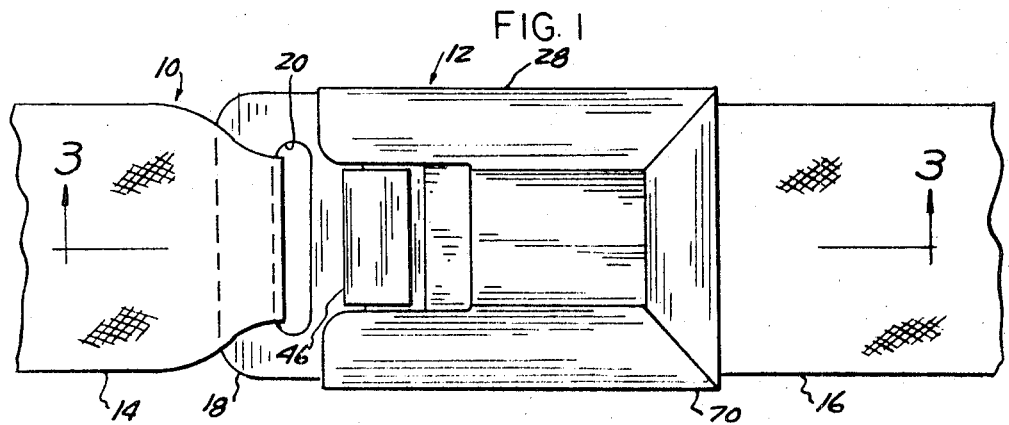

Now referring to the drawings and in particular FIGURES 1 and 5, a seat belt buckle assembly embodying the present invention comprises a first buckle section generally indicated at 10 and a second buckle section generally indicated at 12. Each of the sections 10 and 12 are adapted to join the respective ends 14 and 16 of a belt which may be formed from a nylon webbing or other suitable material.

The first buckle section includes a tongue element 18 having an aperture 20 for engaging the looped end of the belt section 14, and a second preferably rectangular aperture 22 adjacent the leading edge of the tongue 18 and including a leading edge 24. The tongue member 18 has tapered sides extending from its leading edge which terminates in a narrow width which in turn terminates at abutment shoulders 26 which are provided on opposite side edges of the tongue member 18. The tongue 18 has a larger width commencing with the abutment shoulders 26 and terminating with the trailing edge of the tongue.

The second buckle section 12 comprises a housing 28 which is preferably open at opposite ends. The housing 28 includes a base portion 30, normally extending side walls sections 32 each of which terminate at inwardly directly flanges 34.

Spaced from one open end of the housing 28 which will be referred to as the insertion opening 36, a projection or lug 38 is formed in the base 30. The lug 38 preferably has an abutment edge formed parallel to and spaced from the insertion opening 36.

A locking member generally indicated at 40 is slidably disposed within the housing 28 and includes a body portion 42 which is spaced from the base 30 by side sections 44. A finger gripping portion 46 forms an integral extension of the body portion from the end of the body nearest the insertion opening 36. The finger gripping portion 36 extends between the flanges 34 and then is bent back toward the body portion 42 as can best be seen in FIGURES 3 and 4.

Opposite from the finger gripping portion, the locking member 40 has a shoulder section 48 which extends toward the base portion 30 and is spaced therefrom a distance corresponding to the thickness of the tongue 18. The shoulder section 48 is then bent sharply upwards to form a flange 50 which terminates approximately flush with a plane forming an extension of the upper surface of the flanges 34.

Figure 3:
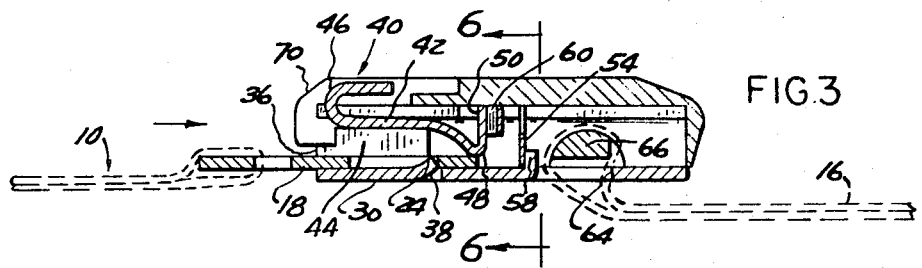
FIGURE 3 is a sectional view taken through the buckle assembly along lines 3—3 of FIGURE 1 and showing the tongue section in a locked position.
Figure 4:
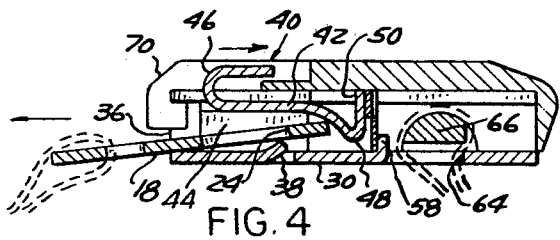
FIGURE 4 is a sectional view similar to FIGURE 3 but showing the locking member in the released position permitting separation of the tongue section from the body section.

Now still referring to FIGURES 3 and 4, it can be seen that the insertion opening 36 of the housing member is adapted to receive the tongue 18 which overlays the base portion 30 of the housing such that the leading edge 24 of the aperture 22 abuts the leading edge of the lug 38. The locking member 40 is slidably disposed in the housing 28 between a first position wherein it overlays the tongue 18 to prevent separation of the tongue 18 from the base portion 30. FIGURE 3 illustrates the locking member with the shoulder 48 overlaying the leading edge of the tongue 18 and FIGURE 4 illustrates the shoulder 48 clearing the tongue 18 to permit disengagement of the tongue with the lug 38.

Figure 2:
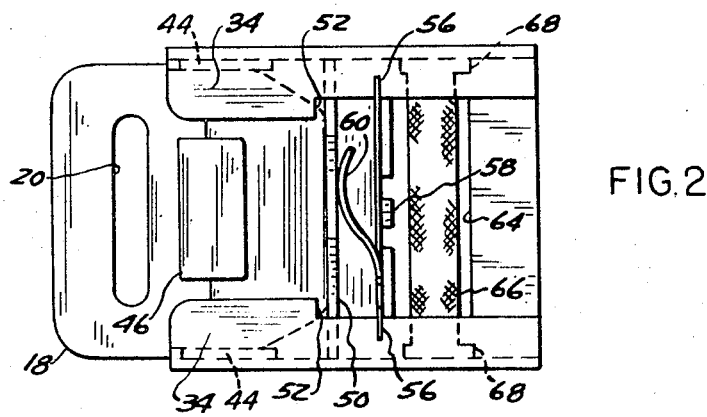
FIGURE 2 is a plan view of the seat belt buckle assembly illustrated in FIGURE 1 but with parts cut away and with other parts removed for purposes of clarity.

Now referring to FIGURE 2, each of the housing flanges 34 is cut away outwardly to provide shoulders 52. The movement of the locking member 40 toward the insertion opening 36 is restricted or limited by the flange member 50 abutting the shoulders 52. In this extreme position, the shoulder 48 overlays the tongue 18 as heretofore described.

Spaced from the shoulders 52, a flat spring member 54 is slidably disposed in slots 56 provided in the flanges 34 and anchored against endwise movement by a finger 58 formed in the base 30 as can best be seen in FIGURES 2 and 3. Spring 54 has a resilient bent portion 60 which abuts the flange 50 to normally urge it toward the abutment shoulders 52. Thus the locking member 40 is normally disposed in a locking position with the shoulder 48 overlaying the tongue 18. A force applied to the finger gripping portion 46 parallel to the base portion 30 and sufficient to overcome the urging of the spring 60 will move the locking member 40 into a position to release the tongue 18.

Now as can best be seen in FIGURE 5, the ends of each of the side sections 44 of the locking member are provided with a cutout section 62 which has a height corresponding to the thickness of the tongue 18 and which permit the abutment shoulders 26 of the tongue to pass thereunder to come into abutment with the inner edge of the cutouts. The cutouts 62 thus cooperate with the shoulder 48 to prevent separation of the tongue 18 from the base of the housing 28 when the locking member is in its extreme locking position.

Now as can best be seen in FIGURES 2, 3 and 4, the housing 28 has an elongated aperture 64 formed transversely in the base 30 at the end opposite the insertion opening 36. The aperture 64 has a length to accommodate the belt member 16 which is provided with a looped end. An adjustment bar 66 having enlarged ends 68 is slidably disposed in the housing 28 and has an overall length greater than the length of the aperture 64. The bar 66 preferably has a generally semi-circular cross section provided with a knurled peripheral surface. The bar 66 engages the looped end of the belt 16 to the housing and generally has rounded edges to prevent cutting of the safety belt and permit free sliding action of the belt thereover.

FIGURE 7 illustrates an alternative form of adjustment bar 69A having enlarged rectangular ends 69B, only one of which is shown. The aperture 64 has a length sufficient to accommodate the belt 16 but terminates short of side wall sections 32 to form side sections 69C. The enlarged ends 69B are slidably disposed between the flanges 34 and the side sections 69C and have a dimension transverse to the body of the bar 69A greater than the distance between the flanges 34 and the side sections 69C. Thus the bar 69A is prevented from rotating within the housing.

Preferably the end sections 69B are formed off center to the body of the bar 69A as shown to accommodate the belt 16, now shown in FIGURE 7, which is looped through the aperture 64 and around the top surface of the body of the bar. The body of the bar 69A is preferably knurled as at 69D to permit an improved frictional engagement with the belt 16.

It is to be understood that two major advantages are achieved by an adjustment bar of the type illustrated by bar 66 and bar 69A. First the housing 28 is not weakened by the provision of slots formed in the sidewalls 32. Secondly, the housing 28 is not weakened by the sidewalls 32 being sprung apart in order to assemble bars guided by slots as is required in conventional seat belt buckles.

Now referring to FIGURE 5, a top member 70 preferably formed of a plastic material and having a width corresponding to the width of the housing 28 has a recess 72 to accommodate the finger gripping portion 46 and a pair of flanges 74 provided for opposite edges of the insertion opening 36. Each of the flanges 74 has a slot 76 to engage the flange 34 of the housing member. Normally the top 70 will be assembled to the housing 28 by engaging the slots 76 with the flanges 34 adjacent the insertion opening 36 and then snapping a resilient flange 78 carried at the opposite end of the top 70 around the opposite open end of the housing 28.

It is to be understood that I have described in detail a seat belt buckle assembly comprising a minimum number of operative parts and including a first buckle section comprising the open ended housing 28 adapted to receive the tongue 18 and including the locking member 40 slidably disposed in the housing for movement into and out of an overlaying engagement with the tongue to prevent separation of the tongue 18 with respect to the base 30 of the housing. The spring member 54 normally urges the locking member into position wherein it locks the tongue 18 in overlapping relationship with the base 30 including at least three points of contact with the tongue to ensure positive engagement therewith.

It can be seen that because of the relatively few components of the preferred seat belt buckle that an extremely rigid and reliable assembly has been disclosed. Furthermore the housing 28 which bears the bulk of the stresses between the opposite belt ends has relatively few apertures defined therein; thus reducing to a minimum the weakening effect of such apertures as are normally found in conventional seat assembly is provided in the structure which prohibits accidental disengagement of the separable buckle sections by providing that the force to disengage the sections must be imposed in a direction parallel to the buckle rather than toward or away from the buckle housing as is common in buckles known in the prior art.

Although I have disclosed but one preferred embodiment of the present invention, it will be obvious to one skilled in the art that many changes and modifications may be made therein without departing from the spirit of the invention.

Having thus described my invention, I claim:

1. A seat belt buckle assembly comprising:
   (a) a tongue member affixed to one end of a first webbing, having a planar section extending beyond the webbing and having an aperture in said planar section; and
   (b) a buckle member connected to the end of a second webbing section, said buckle member having
      (1) a planar base;
      (2) a cover section supported parallel to and spaced from said base;
      (3) a lug extending from the base member in the direction of the cover;
      (4) a locking member slidably supported with respect to the base and the cover for motion along a line parallel to the base;
      (5) a section on said locking member disposed separated from the base, in the direction of the cover, by a distance substantially corresponding to the thickness of said tongue;
      (6) an opening in the buckle member through which the extending section of the tongue member may be inserted so as to dispose it in parallel abutment to the base with the lug extending through the aperture;
      (7) a handle member connecting to the locking member so that the locking member may be moved between a release position wherein the said section of the locking member is sufficiently separated from the lug so that the extending section of the tongue may be disposed in or removed from abutment with the base with the lug extending through the aperture, or a locked position wherein said section of the locking member overlies that end of the extending tongue section beyond the aperture from the tongue end to which the first webbing section is connected;

(8) spring means for biasing said locking section toward its locked position; and (9) means supported between the base and the cover operative to engage that side of the extending tongue section opposite to the one which contacts the base at two spaced points on opposed edges of the tongue, said points being arrayed on a line which extends across the width of the tongue between the aperture and the connection between the first webbing section and the tongue, at such time as the extending end of the tongue lies in abutment with the base and the locking member is in its locked position, to thereby restrain said tongue section against motion away from the base.

2. The seat belt buckle assembly of claim 1 wherein the means supported between the base and the cover operative to engage that side of the extending tongue section opposite to the one which contacts the base at two spaced points, is separated from the base, in the direction of the cover, by a distance substantially corresponding to the thickness of said tongue.

3. The seat belt buckle assembly of claim 1 wherein the means supported between the base and cover operative to engage that side of the extending tongue section opposite to the one which contacts the base at two spaced points, constitutes part of the locking member.

4. The sea belt buckle assembly of claim 1 wherein the cover section is supported on a pair of parallel extending walls which project from the sides of said base, said walls having inwardly directed flanges at their ends opposite to the base, said base, walls and flanges framing said opening in the buckle member, at one end of the buckle member.

5. A seat belt buckle assembly, comprising:
 (a) a first buckle section having an apertured tongue; and
 (b) a second buckle section, comprising
  (1) a housing having a base, spaced sidewalls extending upwardly from said base, and flanges extending inwardly from said sidewalls to form a guide channel, said base having a lug for engaging said tongue, and said inwardly extending flanges having a corresponding pair of shoulder sections, and said housing having an open end to receive said tongue into said guide channel;
  (2) a locking member having a shoulder portion and a depending transverse flange, said locking member being slidably movable within said guide channel between a first position wherein the transverse flange of said locking member abuts the shoulder sections of the flanges of said housing to limit the movement of said locking member towards said open end, and the shoulder portion of said locking member overlappingly maintains the engagement of said apertured tongue and said lug to prevent relative movement of said first buckle section and said second buckle section away from one another, and a second position permitting disengagement of said tongue and said lug to permit separation of said first buckle section and said buckle section; and
  (3) spring bias means having an anchor portion fixed to said housing and a resilient portion urging said locking member toward said first position.

6. A seat belt buckle assembly as defined in claim 5, in which the locking member includes a body portion and side sections, said body portion underlying said housing flanges and spaced from the base portion of said housing and said side sections associated with the side portions of said housing to form a cavity for reception of said apertured tongue of said first buckle section, and said body portion has a finger-grip extension projecting between the flanges of said housing and adapted for the application of a releasing force on said locking member sufficient to overcome the force imposed by said biasing means on said locking member.

7. A seat belt buckle assembly as defined in claim 6, wherein said locking member sides have notched sections for engaging the side edges of said tongue when said locking member is in the first position, said notch sections cooperating with said shoulder portion to maintain said tongue in a position overlapping the base portion of said housing.

8. A seat belt buckle assembly as defined in claim 7, wherein said base portion has an aperture defined therein at the end of said guide channel opposite the open end of said housing, said aperture having a length sufficient to accommodate the width of a looped belt section; and including a bar member slidably disposed in said housing, said bar member having a length greater than the length of said aperture and operable to connect said looped belt section to said housing.

9. A seat belt buckle assembly as defined in claim 5, in which said spring member includes a flat section transversely disposed in said guide channel, said housing flanges having slots engaging the extreme ends of said flat section and said base portion has a projection abuting the mid-section of said flat section to prevent longitudinal movement in at least one direction.

10. A seat belt buckle assembly as defined in claim 5, in which said locking member has an integral finger-grip extension projecting between the flanges of said housing and adjacent the open end of said housing for applying a force on said locking member, in a direction parallel to said base portion and away from said open end and of a magnitude sufficient to overcome the urging force of said bias means on said locking member, and including a cover member for enclosing the open section of said housing between said housing flanges, said cover member having flange elements for engaging the opposite ends of said housing and including a recessed portion permitting movement of said finger-grip extension.

11. The invention as defined in claim 5, wherein said locking member is disposed within the extreme ends of said guide channel in all operative positions.

References Cited

UNITED STATES PATENTS 3,127,655  4/1964  Carter.
3,130,466  4/1964  Carter.

BERNARD A. GELAK, Primary Examiner

U.S. Cl. X.R.

24—116, 230